W. W. ATWOOD.
CLAMP.
APPLICATION FILED MAY 8, 1918.
1,281,480.
Patented Oct. 15, 1918.
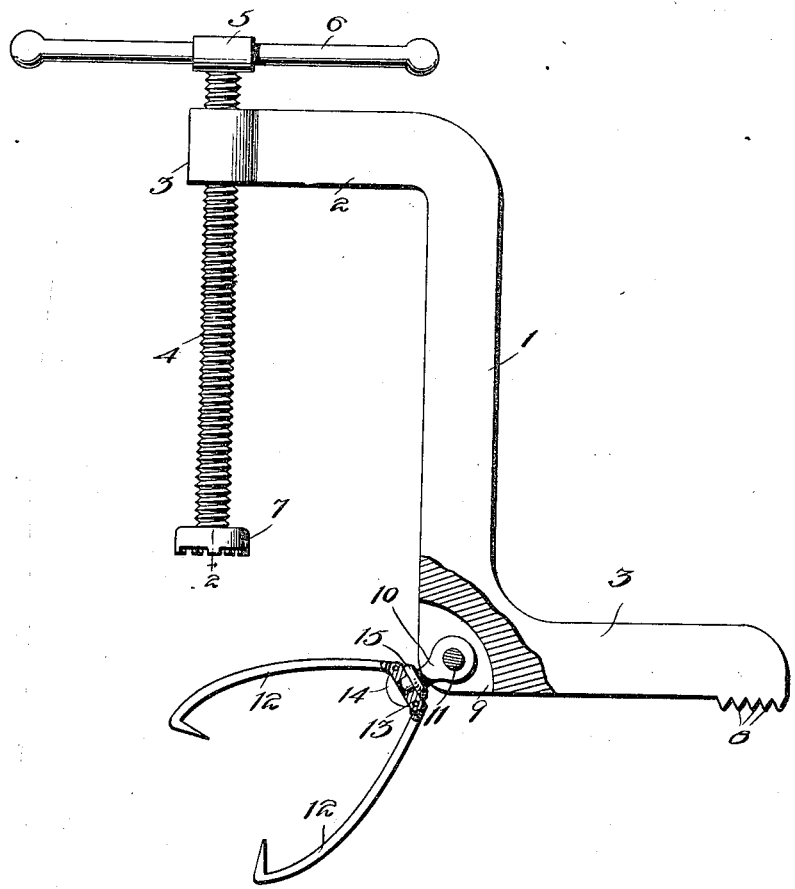
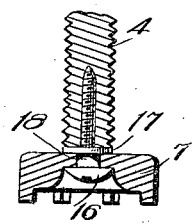
WITNESSES
George C. Myers.
INVENTOR
WALTER W. ATWOOD,
BY
ATTORNEYS

UNITED STATES PATENT OFFICE.

WALTER WHITAKER ATWOOD, OF TAMPA, FLORIDA, ASSIGNOR OF ONE-HALF TO HOMER P. BOYCE, OF TAMPA, FLORIDA.

CLAMP.

1,281,480.  Specification of Letters Patent.   Patented Oct. 15, 1918.

Application filed May 8, 1918. Serial No. 233,304.

*To all whom it may concern:*

Be it known that I, WALTER WHITAKER ATWOOD, a citizen of the United States, and a resident of Tampa, in the county of Hillsborough and State of Florida, have invented certain new and useful Improvements in Clamps, of which the following is a specification.

My invention is an improvement in clamps, and has for its object to provide a device of the character specified, especially adapted for ship carpenters' work, wherein means is provided in connection with the clamp for grasping the studding, together with a screw for forcing the plank into place, the grasping means having a double swivel connection with the clamp.

In the drawings:

Figure 1 is a plan view of the clamp, with parts in section;

Fig. 2 is a section on the line 2—2 of Fig. 1.

In the present embodiment of the invention, the clamp frame consists of a body 1 having at each end an angular arm 2 and 3, respectively, the said arms extending at approximately right angles to the body and in opposite directions.

The arm 2 has at the end remote from the body an internally threaded sleeve or nut 3, through which is threaded a screw 4, and the screw has at one end a bearing or sleeve 5 in which is held a cross handle 6. At the opposite end of the sleeve there is a chuck 7. The arm 3 of the clamp body or frame has at the end remote from the body and at the opposite edge a series of teeth 8 for preventing slipping of the frame.

At the junction of the arm 3 with the body of the frame there is provided a notch or recess 9, and within this recess is received one end of a swivel 10. A bolt or rivet 11 is passed through the opposite sides of the recess and through the eye of the swivel, for pivotally connecting the swivel to the frame.

A pair of hooks 12 is supported by the swivel, the said hooks being connectetd to a plate 13 which is swiveled on the swivel. The swivel has a head 14 at the outer side of the plate, and an annular shoulder or rib 15 at the inner side, and it will be obvious that the hooks and the plate may be rotated with respect to the clamp body or may be swung toward and from the screw. As shown in Fig. 2, the chuck 7 has a central opening and a screw 16 is passed through the opening and engages a threaded opening in the end of the screw 4.

A washer 17 is arranged between the screw and the chuck, and it will be noticed that the screw has a plain portion 18 for engaging the opening of the chuck.

In use, the hooks are engaged with the studding, and it will be obvious that these hooks may be swung into any desired position to make the proper engagement. By means of the screw the plank may be forced into place. These hooks serve to give a positive hold on the timbers and make the placing of the clamp in position quick and easy, especially when ceiling a vessel on the inside after the outer planking has been put in place. It will be obvious that the hooks 12 have their bills extending toward each other.

I claim:

1. A clamp of the character specified, comprising a frame consisting of a body having at each end an angular arm extending in opposite directions, one of the arms having a nut and the other having teeth at the end and edge remote from the body, a screw threaded through the nut, and a pair of hooks swiveled to the frame of the clamp at the junction of the body with the arm having the teeth, the swivel connection comprising a swivel, the frame having a recess for receiving the swivel and the swivel being pivoted to the frame.

2. A clamp of the character specified, comprising a frame consisting of a body having at each end an angular arm extending in opposite directions, one of the arms having a nut and the other having teeth at the end and edge remote from the body, a screw threaded through the nut, and a pair of hooks swiveled to the frame of the clamp at the junction of the body with the arm having the teeth.

WALTER WHITAKER ATWOOD.

Witnesses:
 HOMER P. BOYCE,
 R. P. HENDERSON.

Copies of this patent may be obtained for five cents each, by addressing the "Commissioner of Patents, Washington, D. C."